(12) United States Patent
Sakai

(10) Patent No.: US 12,582,913 B2
(45) Date of Patent: Mar. 24, 2026

(54) SYSTEM, NON-TRANSITORY COMPUTER-READABLE STORAGE MEDIUM, METHOD, AND INFORMATION PROCESSING APPARATUS FOR EXECUTING A COMMUNICATION GAME WITH ANOTHER APPARATUS

(71) Applicant: Nintendo Co., Ltd., Kyoto (JP)

(72) Inventor: Shunta Sakai, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 334 days.

(21) Appl. No.: 18/319,277

(22) Filed: May 17, 2023

(65) Prior Publication Data

US 2023/0415045 A1 Dec. 28, 2023

(30) Foreign Application Priority Data

Jun. 27, 2022 (JP) ................................. 2022-102497

(51) Int. Cl.
*A63F 13/71* (2014.01)
*A63F 13/35* (2014.01)
(52) U.S. Cl.
CPC .............. *A63F 13/71* (2014.09); *A63F 13/35* (2014.09)
(58) Field of Classification Search
CPC .......... A63F 13/71; A63F 13/73; A63F 13/75; A63F 13/77; A63F 13/69; A63F 2300/609; A63F 13/35
See application file for complete search history.

(56) References Cited

U.S. PATENT DOCUMENTS 11,291,921 B1 * 4/2022 Schindler .............. H04L 67/131
2004/0009815 A1 1/2004 Zotto et al.
(Continued)

FOREIGN PATENT DOCUMENTS

CN 1692340 A 11/2005
JP 2005-102021 A 4/2005
(Continued)

OTHER PUBLICATIONS

Electronic Arts, "It Takes Two—Official Launch Trailer" available at https://www.youtube.com/watch?v=3UllG0zL6sA&t=1s, Mar. 31, 2021 (Year: 2021).*

*Primary Examiner* — Jay Trent Liddle
(74) *Attorney, Agent, or Firm* — Nixon & Vanderhye PC

(57) ABSTRACT

A system that executes a communication game with communication between/among a plurality of terminals is provided. Each of the terminals includes content data that is available at least in the communication game when at least a predetermined condition is satisfied and a decryption key. A first terminal of the terminals that satisfies at least the predetermined condition includes an encryption key corresponding to the decryption key. The first terminal transmits encrypted data encrypted with the encryption key to another terminal when it executes the communication game. When another terminal receives the encrypted data from the first terminal, another terminal verifies the encrypted data based on the decryption key. When verification of the encrypted data received from the first terminal is successful, a second terminal of the terminals that does not satisfy the predetermined condition permits temporary use of content data in the communication game by the second terminal.

18 Claims, 13 Drawing Sheets

(56)                    References Cited

U.S. PATENT DOCUMENTS

| | | | |
|---|---|---|---|
| 2005/0149340 A1 | 7/2005 | Murakami et al. | |
| 2007/0283420 A1 | 12/2007 | Rantalahti | |
| 2007/0293319 A1 | 12/2007 | Stamper et al. | |
| 2010/0131411 A1 | 5/2010 | Jogand-Coulomb et al. | |
| 2011/0212769 A1* | 9/2011 | Carroll .................... | A63F 13/69 |
| | | | 463/29 |
| 2019/0299101 A1* | 10/2019 | Wakeford ............... | A63F 13/73 |
| 2021/0138349 A1* | 5/2021 | Zien ........................ | A63F 13/69 |
| 2022/0355207 A1* | 11/2022 | Koch ...................... | A63F 13/79 |

FOREIGN PATENT DOCUMENTS

| | | | |
|---|---|---|---|
| JP | 2008-012072 A | 1/2008 | |
| JP | 2009060629 A | 3/2009 | |

* cited by examiner

Figure 7:
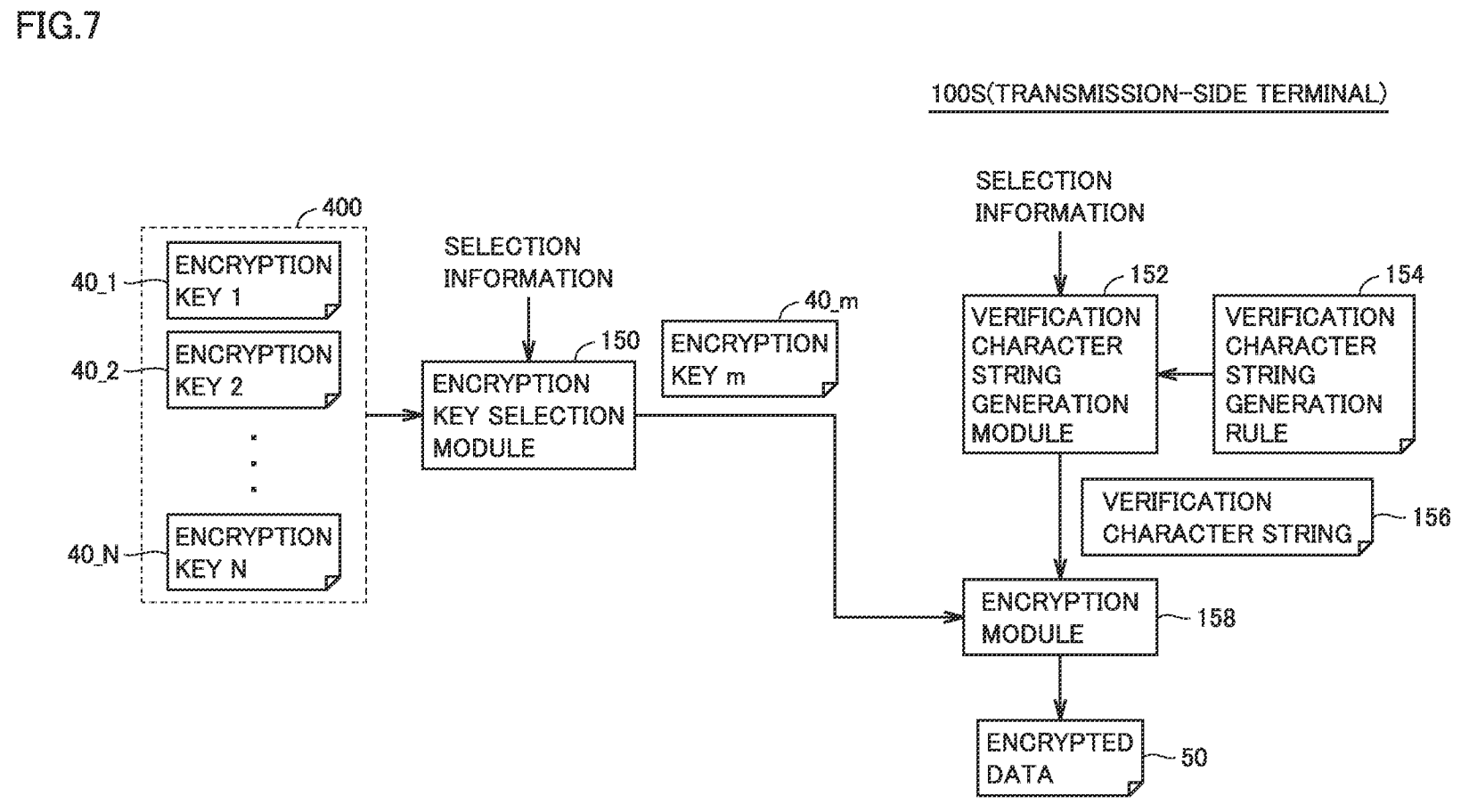

100S(TRANSMISSION-SIDE TERMINAL)

SELECTION INFORMATION

VERIFICATION CHARACTER STRING GENERATION MODULE — 152

VERIFICATION CHARACTER STRING GENERATION RULE — 154

VERIFICATION CHARACTER STRING — 156

ENCRYPTION MODULE — 158

ENCRYPTED DATA — 50

ENCRYPTION KEY m — 40_m

SELECTION INFORMATION

ENCRYPTION KEY SELECTION MODULE — 150

400

ENCRYPTION KEY 1 — 40_1

ENCRYPTION KEY 2 — 40_2

ENCRYPTION KEY N — 40_N

FIG.12

SYSTEM, NON-TRANSITORY COMPUTER-READABLE STORAGE MEDIUM, METHOD, AND INFORMATION PROCESSING APPARATUS FOR EXECUTING A COMMUNICATION GAME WITH ANOTHER APPARATUS

This nonprovisional application claims priority on Japanese Patent Application No. 2022-102497 filed on Jun. 27, 2022 with the Japan Patent Office, the entire contents of which are hereby incorporated by reference.

FIELD

The present disclosure relates to a system, a program, a method, and an information processing apparatus.

BACKGROUND AND SUMMARY

For example, when a certain user possesses additional content data in execution of a communication game between/among a plurality of users, zest of the communication game may be improved by permitting another user who does not possess the content data to use the content data.

A configuration for execution of a communication game between a master and one or more slaves by transmission of a transfer-purpose program for slave to the slaves has been known.

When an above-described method of transmitting content data to another user each time is adopted, some time period for transmission may be required depending on an amount of content data.

In order to address this, content data itself may be stored in a terminal that each user uses, and use of the content data may be permitted only when a predetermined condition is satisfied. For example, when a certain user satisfies a predetermined condition whereas another user fails to satisfy the predetermined condition, that another user may also be permitted to temporarily use the content data.

In an example where such a method is adopted, when there is an unauthorized terminal that disguises itself as satisfying the predetermined condition although it actually fails to satisfy the predetermined condition, not only the unauthorized terminal but also another terminal that fails to satisfy the predetermined condition may also be permitted to use the content data.

The present disclosure provides a scheme to permit, only when there is a terminal that formally satisfies a predetermined condition, temporary use of content data also in another terminal in a communication game.

(Configuration 1) One embodiment provides a system that executes a communication game with communication between/among a plurality of terminals. Each of the plurality of terminals includes content data that is available at least in the communication game when at least a predetermined condition is satisfied and a decryption key. A first terminal of the plurality of terminals that satisfies at least the predetermined condition includes an encryption key corresponding to the decryption key. The first terminal transmits encrypted data encrypted with the encryption key to another terminal when the first terminal executes the communication game. When the another terminal receives the encrypted data from the first terminal, the another terminal verifies the encrypted data based on the decryption key. When verification of the encrypted data received from the first terminal is successful, a second terminal of the plurality of terminals that does not satisfy the predetermined condition permits temporary use of the content data in the communication game by the second terminal.

According to Configuration 1, the encrypted data transmitted from the first terminal that satisfies the predetermined condition can be verified by another terminal. In other words, another terminal can verify satisfaction of the predetermined condition by the first terminal. Presence of the terminal (first terminal) that formally satisfies the predetermined condition is verified, and then use of content data can temporarily be permitted also in other terminals. Zest of the communication game can thus be improved.

(Configuration 2) In Configuration 1, each of the plurality of terminals may include a plurality of decryption keys. The first terminal may include a plurality of encryption keys corresponding to the plurality of decryption keys, respectively. The first terminal may generate the encrypted data with an encryption key selected from the plurality of encryption keys based on information held in the another terminal. The another terminal may verify the encrypted data with a decryption key selected from the plurality of decryption keys based on the information held in the another terminal.

According to Configuration 2, a security level can be higher than in use of a single encryption key and a single decryption key.

(Configuration 3) In Configuration 1 or 2, each of the plurality of terminals may hold the encryption key when the predetermined condition is satisfied.

According to Configuration 3, since the terminal does not hold the encryption key unless the predetermined condition is satisfied, the security level can further be higher.

(Configuration 4) In Configuration 1 or 2, each of the plurality of terminals may further include the encryption key. Each of the plurality of terminals may be permitted to use the encryption key when the predetermined condition is satisfied.

According to Configuration 4, each of the plurality of terminals includes the encryption key regardless of whether or not the predetermined condition is satisfied. The terminal can then use the encryption key only when the predetermined condition is satisfied. Distribution of the encryption key necessary for transmission of the encrypted data can thus be facilitated.

(Configuration 5) In any of Configurations 1 to 4, the first terminal may transmit the encrypted data to at least all other terminals included in the plurality of terminals.

According to Configuration 5, since the encrypted data can be transmitted, for example, without making such determination that the encrypted data be preferentially transmitted to a terminal that fails to satisfy the predetermined condition, a time period required for verification of encrypted data can be shorter.

(Configuration 6) In any of Configurations 1 to 5, when the second terminal receives a plurality of pieces of the encrypted data and verification of one piece of encrypted data of the plurality of pieces of encrypted data is successful, the second terminal may temporarily permit use of the content data in the communication game by the second terminal.

According to Configuration 6, when verification of at least one piece of encrypted data is successful in spite of reception of a plurality of pieces of encrypted data, subsequent verification does not have to be made. Therefore, a time period required for verification of encrypted data can be shorter and consumption of resources required for the verification can be suppressed.

(Configuration 7) In Configuration 6, each of the first terminals may transmit information indicating that each of the first terminals satisfies the predetermined condition, to at least all other terminals included in the plurality of terminals. The another terminal may determine whether the another terminal has received the encrypted data from all of the first terminals, based on the information indicating satisfaction of the predetermined condition.

According to Configuration 7, since each of the plurality of terminals can check reception of encrypted data from all terminals that are supposed to transmit the encrypted data, temporary use of application data can more reliably be realized.

(Configuration 8) In Configuration 7, when the encrypted data is received from all of the first terminals and verification of all pieces of received encrypted data fails, use of the content data in the communication game by the second terminal may not be permitted.

According to Configuration 8, all pieces of transmitted encrypted data are verified and then whether or not temporary use of content data is permitted can be determined.

(Configuration 9) In any of Configurations 1 to 8, the communication game may include a game phase in which the plurality of terminals proceed with a game and a preparation phase preceding the game phase. Even when the first terminal that has transmitted the successfully verified encrypted data leaves from the communication game in the preparation phase, in a game phase following the preparation phase, use of the content data may continually be permitted in the second terminal temporarily permitted to use the content data.

According to Configuration 9, after encrypted data transmitted from the first terminal is successfully verified and use of content data is temporarily permitted, in spite of leaving of the first terminal, use of the content data is continually permitted. Therefore, a user has no unpleasant experience.

(Configuration 10) In Configuration 9, when an operation by a user in connection with use of the content data is accepted in the preparation phase, in spite of leaving of the first terminal that has transmitted the successfully verified encrypted data from the communication game in the preparation phase, use of the content data may continually be permitted in the game phase.

According to Configuration 10, the user does not have such unpleasant experience as unavailability of content data due to leaving of another terminal after acceptance of an operation by the user in connection with use of the content data.

(Configuration 11) Another embodiment provides a program for execution of a communication game with communication with another apparatus. The program causes a computer including content data that is available at least in the communication game when at least a predetermined condition is satisfied and a decryption key to perform: receiving encrypted data encrypted with an encryption key corresponding to the decryption key from an apparatus among other apparatuses that satisfies the predetermined condition, verifying the received encrypted data based on the decryption key, and temporarily permitting use of the content data in the communication game when verification of the encrypted data is successful while the predetermined condition is not satisfied.

(Configuration 12) Yet another embodiment provides a method of executing a communication game with communication between/among a plurality of terminals. Each of the plurality of terminals includes content data that is available at least in the communication game when at least a predetermined condition is satisfied and a decryption key. The method includes transmitting, by a first terminal of the plurality of terminals that satisfies the predetermined condition, encrypted data encrypted with an encryption key corresponding to the decryption key to another terminal when the first terminal executes the communication game, verifying, by the another terminal, when the another terminal receives the encrypted data from the first terminal, the encrypted data based on the decryption key, and temporarily permitting, by a second terminal of the plurality of terminals that does not satisfy the predetermined condition, use of the content data in the communication game by the second terminal when verification of the encrypted data received from the first terminal is successful.

(Configuration 13) Still another embodiment provides an information processing apparatus that executes a communication game with communication with another information processing apparatus. The information processing apparatus includes content data that is available at least in the communication game when at least a predetermined condition is satisfied, a decryption key, verification means for verifying, when the verification means receives encrypted data encrypted with an encryption key corresponding to the decryption key from an information processing apparatus among other information processing apparatuses that satisfies the predetermined condition, the encrypted data based on the decryption key, and permission means for temporarily permitting use of the content data in the communication game when verification of the encrypted data is successful while the predetermined condition is not satisfied.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 1 shows an exemplary illustrative non-limiting drawing illustrating an exemplary system according to the present embodiment.

FIG. 7 shows an exemplary illustrative non-limiting drawing illustrating a more detailed exemplary functional configuration of the terminal (transmission-side terminal) shown in FIG. 6.

FIG. 12 shows an exemplary illustrative non-limiting flowchart illustrating a more detailed processing procedure in step S212 shown in FIG. 10.

DETAILED DESCRIPTION

Figure 2:
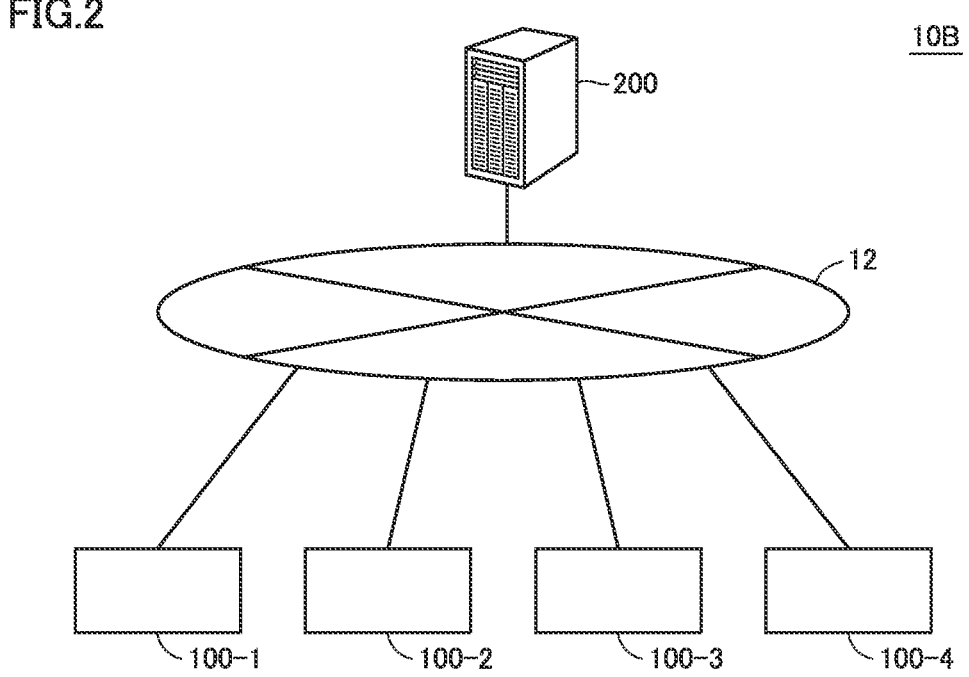
FIG. 2 shows an exemplary illustrative non-limiting drawing illustrating another exemplary system according to the present embodiment.

The present embodiment will be described in detail with reference to the drawings. The same or corresponding elements in the drawings have the same reference characters allotted and description thereof will not be repeated.

A. Overview

An exemplary configuration of a system that executes a communication game according to the present embodiment will initially be described.

Figure 1:
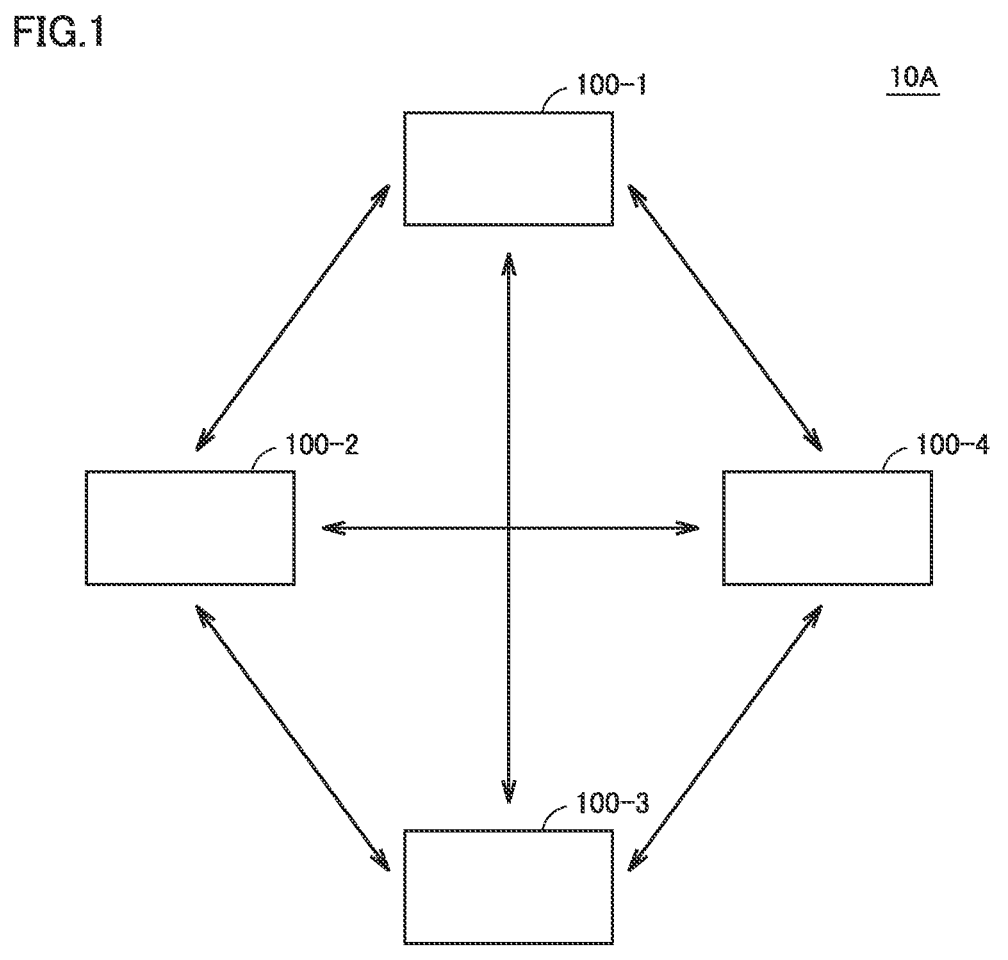

FIG. 1 shows an exemplary system according to the present embodiment. FIG. 1 shows a system 10A composed of four terminals 100-1 to 100-4 (which may also collectively be referred to as a "terminal 100" below) by way of example. Terminals 100-1 to 100-4 are each an exemplary information processing apparatus, and execute a communication game with communication. In other words, each of terminals 100 executes the communication game with communication with another terminal 100.

In system 10A shown in FIG. 1, one terminal 100 may be a "master" who manages the communication game and another terminal 100 may be a "slave" that performs processing in accordance with the "master".

So long as data can mutually be exchanged among terminals 100-1 to 100-4 in system 10A shown in FIG. 1, communication may be wired or wireless.

FIG. 2 shows another exemplary system according to the present embodiment. In a system 10B shown in FIG. 2, each of four terminals 100-1 to 100-4 is connected to a network 12. A server 200 that performs at least a part of processing necessary for a communication game is connected to network 12. Terminals 100-1 to 100-4 execute the communication game with server 200 being interposed.

In system 10B shown in FIG. 2, communication for connection of terminals 100-1 to 100-4 to network 12 may be wired or wireless. Alternatively, server 200 shown in FIG. 2 may be eliminated and terminals 100-1 to 100-4 may communicate with one another over network 12.

The "communication game" herein encompasses a game in which one or more users are involved, and any kind of game is applicable. For example, the communication game may include a player-versus-player (PVP) game or a game in which a plurality of users can simultaneously participate. A virtual user who behaves like a user may participate in the communication game.

In the system according to the present embodiment, terminal 100 can hold content data restricted in use. The content data can be used at least in the communication game when at least a predetermined condition is satisfied. Terminal 100 is permitted to use content data also when single terminal 100 alone executes some game, instead of the case where terminal 100 that satisfies at least the predetermined condition executes the communication game with communication with another terminal 100.

"Content data" herein encompasses data used in the communication game and may be a part of application data for the communication game or the application data itself. By way of example, the "content data" includes a stage, a character, an item, a skill, and the like.

The "predetermined condition" herein is freely set. The "predetermined condition" may be satisfied, for example, when a user who uses terminal 100 possesses a right to use content data (which is also referred to as a "right of use" below). The right of use may be possessed, for example, by payment by a user or subscription to a specific service.

The right of use may be granted for each user or for each terminal. In an example where the right of use is granted for each user, even the same terminal 100 may be regarded as not possessing the valid right of use or not satisfying the predetermined condition when a different user uses the terminal. Thus, in an example where a plurality of users share the same terminal 100, use of content data may be permitted only when a user who possesses the right of use uses terminal 100. When the right of use is granted for each terminal, on the other hand, use of content data is permitted regardless of a user who uses terminal 100 to which the right of use is granted.

The "predetermined condition" may also include such a condition as possession, in an example where a communication game to be executed is available in series form, of another communication game in the series, or clearing of a mission in the communication game.

Description will be given below assuming that the "predetermined condition" is satisfied when a user who operates terminal 100 to play a communication game possesses the right of use by way of example.

The system according to the present embodiment provides a scheme to temporarily permit use of content data also in another terminal 100 only when there is a terminal that formally satisfies a predetermined condition.

In an example where possession of the right of use is defined as the predetermined condition, in execution of a certain communication game, when a user who participates in (or is about to participate in) the communication game possesses the right of use, another user who participates in (or is about to participate in) the communication game is also permitted to temporarily use the content data.

Figure 3A:
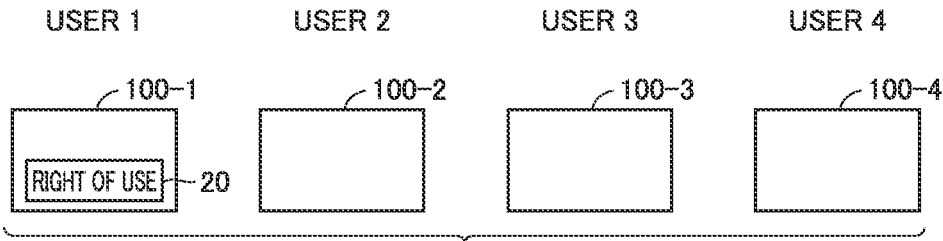
FIGS. 3A to 3C show exemplary illustrative non-limiting drawings illustrating a right of use in the system according to the present embodiment.
Figure 3B:
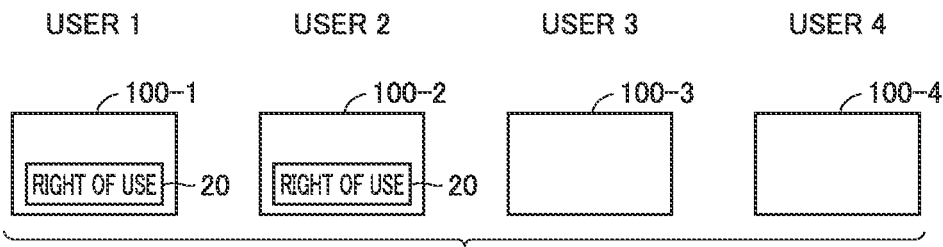
Figure 3C:
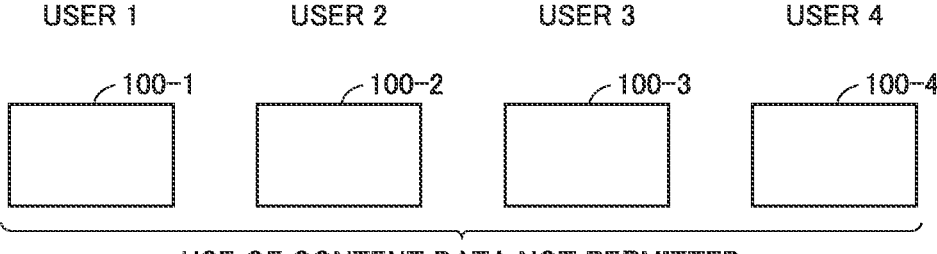

FIGS. 3A to 3C are exemplary illustrative non-limiting drawings illustrating the right of use in the system according to the present embodiment. FIGS. 3A to 3C show an example where four users 1 to 4 use respective terminals 100-1 to 100-4 to execute a communication game.

For example, as shown in FIG. 3A, user 1 who uses terminal 100-1 is assumed as possessing a right of use 20 and users 2 to 4 who use other respective terminals 100-2 to 100-4 are assumed as not possessing right of use 20. Since user 1 (terminal 100-1) who participates in the communication game possesses right of use 20, use of content data is temporarily permitted in the communication game executed by terminals 100-1 to 100-4.

This is also similarly applicable to an example where user 1 who uses terminal 100-1 and user 2 who uses terminal 100-2 each possess right of use 20 as shown in FIG. 3B.

When a plurality of users each possess right of use 20 and contents or a range of content data that is available under rights of use 20 are/is different, restriction to content data that is available under one right of use 20 may be placed, or content data that is available may be determined in consideration of a plurality of rights of use 20.

When none of users 1 to 4 who use respective terminals 100-1 to 100-4 possess right of use 20 as shown in FIG. 3C, use of content data is not permitted.

B. Exemplary Hardware Configuration

An exemplary hardware configuration of an apparatus included in the system according to the present embodiment will now be described.

Figure 4:
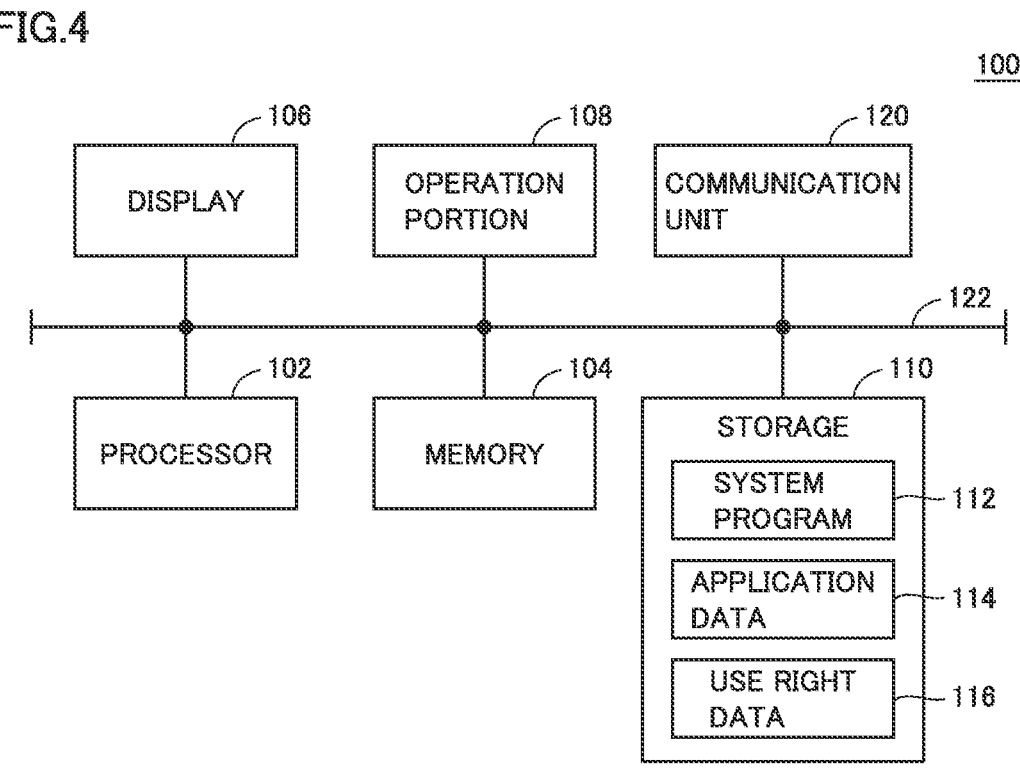
FIG. 4 shows an exemplary illustrative non-limiting drawing illustrating an exemplary hardware configuration of a terminal included in the system according to the present embodiment.

FIG. 4 shows an exemplary hardware configuration of terminal 100 included in the system according to the present embodiment. Referring to FIG. 4, terminal 100 is implemented by a computer by way of example, and includes one or more processors 102, a memory 104, a storage 110, a display 106, an operation portion 108, and a communication unit 120. These components are connected to communicate data with one another through a bus 122.

Processor 102 is a processing entity (processing means) for performing processing provided by terminal 100. Processor 102 reads a system program 112 and application data 114 stored in storage 110 and develops the same on memory 104 for execution.

Memory 104 is a volatile storage device (storage medium) that can be accessed by processor 102, and it may be implemented, for example, by a dynamic random access memory (DRAM) or a static random access memory (SRAM).

Storage 110 is a non-volatile storage device (storage medium) that can be accessed by processor 102, and a hard disk or a flash memory may be employed as the storage. Storage 110 may be, for example, a storage medium attachable to and removable from terminal 100, such as an optical disc and a cartridge.

System program 112 and application data 114 are stored in storage 110. System program 112 and/or application data 114 include(s) an instruction code for implementing processing which will be described later. The "program" that implements processing according to the present embodiment encompasses an instruction code included in system program 112 and/or an instruction code of an application program included in application data 114. Use right data 116 representing right of use 20 may be stored in storage 110 in accordance with an operation by a user.

Display 106 shows an image generated as a result of information processing performed by processor 102. A plurality of displays 106 may be provided. One or more external displays may be used by terminal 100.

Operation portion 108 accepts an operation from a user of terminal 100. Operation portion 108 includes, for example, a push button, a control lever, a touch panel, and/or a mouse. Operation portion 108 may be implemented by a game controller which is separate from terminal 100 and connected through a wire or wirelessly.

Communication unit 120 communicates with another terminal 100 and/or server 200 over network 12. Communication unit 120 may include hardware necessary for wired communication and/or hardware necessary for wireless communication. The entirety or a part of processing by communication unit 120 may be performed by processor 102.

Though FIG. 4 shows terminal 100 as an integrated apparatus, the terminal may be implemented as an assembly of a plurality of apparatuses. In other words, terminal 100 may be implemented by combination of a plurality of independent apparatuses. For example, a configuration composed of a main body including hardware corresponding to processor 102, memory 104, and storage 110 and a terminal portion including hardware corresponding to display 106 and operation portion 108 may be adopted.

At least a part of processing performed in terminal 100 may be performed discretely by another apparatus or a plurality of other apparatuses arranged as being distributed over a network.

Processing performed in terminal 100 may be implemented by execution of a program by processor 102, and a part or the entirety of the processing may be implemented by hard-wired circuitry such as an application specific integrated circuit (ASIC) or a field programmable gate array (FPGA).

The term "processor" herein encompasses not only an ordinary meaning of a processing circuit that performs processing in accordance with an instruction code described in a program, such as a central processing unit (CPU), a micro processing unit (MPU), or a graphics processing unit (GPU), but also hard-wired circuitry such as an ASIC or an FPGA. In the hard-wired circuitry such as an ASIC or an FPGA, a circuit corresponding to processing to be executed is formed in advance. Furthermore, the "processor" herein also encompasses circuitry in which a plurality of functions are integrated, such as a system on chip (SoC).

Server 200 shown in FIG. 2 is implemented, for example, by a general-purpose computer. Since a hardware configuration of the general-purpose computer has been known, detailed description thereof will not be provided.

C. Verification Processing

Exemplary verification processing for provision of the above-described scheme by the system according to the present embodiment will now be described.

Figure 5:
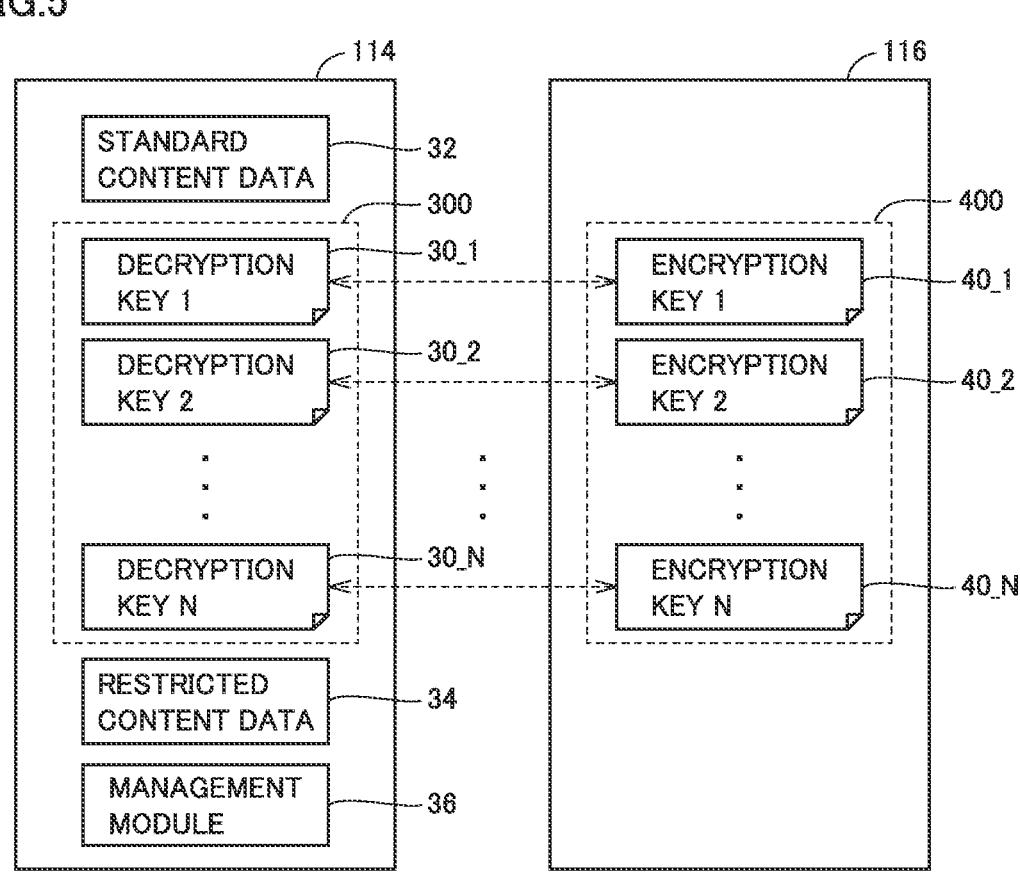
FIG. 5 shows an exemplary illustrative non-limiting drawing illustrating exemplary data included in application data and use right data shown in FIG. 4.

FIG. 5 shows exemplary data included in application data 114 and use right data 116 shown in FIG. 4. Referring to FIG. 5, application data 114 is data for a communication game, and includes standard content data 32 that is available without right of use 20, restricted content data 34 that is available when right of use 20 is possessed, and a management module 36 that manages whether or not restricted content data 34 can be used by way of example. Restricted content data 34 is exemplary content data that is available at least in a communication game when at least a predetermined condition is satisfied.

In the system according to the present embodiment, a key pair group is used for management of right of use 20. The key pair group includes one pair of keys (key pair) or a plurality of pairs of keys (key pairs) generated in accordance with any algorithm. Since one key is used for encryption and the other key is used for decryption in the present embodiment, the key used for encryption is referred to as an "encryption key" and the key used for decryption is referred to as a "decryption key" for the sake of convenience of description.

For example, a secret key and a public key generated in accordance with a known public key encryption platform can be used as such a key pair. In using the key pair of the secret key and the public key, the decryption key can also be used for encryption and the encryption key can also be used for decryption.

Though possession of right of use 20 can be verified by preparation of a single pair of keys (N=1) in the system according to the present embodiment, a plurality of key pairs may be used for raising a security level.

Application data 114 includes a decryption key group 300 including N (N≥2) decryption keys 30_1, 30_2, . . . , and 30_N (a single decryption key being also collectively referred to as a "decryption key 30" below). Each of terminals 100 thus includes a plurality of decryption keys 30.

Use right data 116 includes an encryption key group 400 including N encryption keys 40_1, 40_2, . . . , and 40_N (a single encryption key being also collectively referred to as an "encryption key 40" below) corresponding to respective decryption keys 30. Thus, when a predetermined condition is satisfied, terminal 100 holds encryption key 40 corresponding to decryption key 30. In other words, encryption key group 400 composed of one or more encryption keys 40 is stored in terminal 100 that satisfies a predetermined condition.

By way of example, use right data 116 (including encryption key group 400) may be downloaded from a server that manages right of use 20 to terminal 100 as a user goes through a predetermined procedure (for example, payment for right of use 20).

In this example, since encryption key group 400 is stored in terminal 100 only when it satisfies the predetermined condition, the security level can be raised. When terminal 100 no longer satisfies the predetermined condition (for example, payment for right of use 20 is no longer made), use right data 116 stored in terminal 100 may be erased.

In a modification, use right data 116 and encryption key group 400 may be independent of each other. In this case, use right data 116 or encryption key group 400 may be downloaded to terminal 100 when the user possesses the right of use, for example, by payment by the user or subscription to a specific service by the user.

In another modification, application data 114 may include encryption key group 400 in addition to decryption key group 300. As application data 114 is stored in each terminal 100, each terminal holds encryption key group 400. In this case, use right data 116 does not have to include encryption key group 400 but may include information for accessing encryption key group 400 included in application data 114 instead. Access to encryption key group 400 included in application data 114 may be made by downloading of use right data 116 to terminal 100. In other words, terminal 100 may be permitted to use encryption key 40 as the predetermined condition is satisfied. As decryption key group 300 and encryption key group 400 are incorporated in application data 114, decryption key group 300 and encryption key group 400 are stored regardless of whether or not a predetermined condition is satisfied. Therefore, the scheme to permit temporary use of content data can be realized with a more simplified configuration.

In yet another modification, in installation of application data 114 in terminal 100, use right data 116 may be stored in an area of terminal 100 to which access is restricted. Use right data 116 stored in terminal 100 may be accessed as the user goes through a predetermined procedure after installation.

Figure 6:
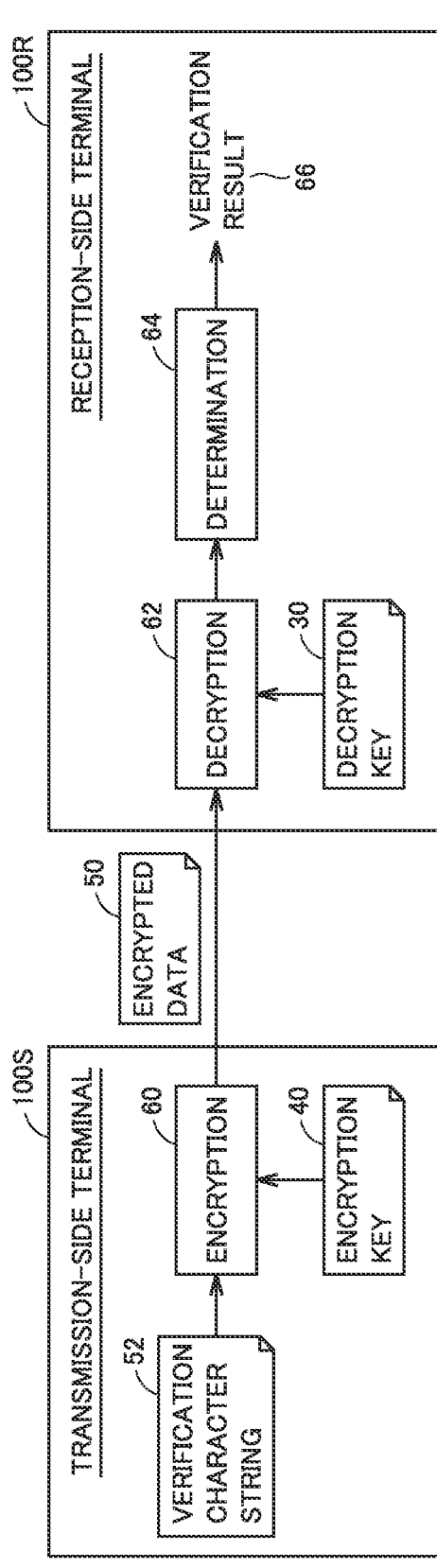
FIG. 6 shows an exemplary illustrative non-limiting drawing illustrating an overview of verification processing in the system according to the present embodiment.

FIG. 6 is an exemplary illustrative non-limiting drawing illustrating an overview of verification processing in the system according to the present embodiment. FIG. 6 shows exemplary exchange between a terminal 100S (transmission-side terminal) used by a user who possesses right of use 20 and a terminal 100R (reception-side terminal) for the sake of convenience of description. Terminal 100S corresponds to a first terminal that satisfies at least a predetermined condition. Terminal 100R corresponds to another terminal. A user who uses terminal 100R possesses right of use 20 in some cases and does not possess right of use 20 in other cases.

Terminal 100S generates encrypted data 50 (encryption processing 60) by encrypting a verification character string 52 with encryption key 40. Terminal 100S transmits encrypted data 50 encrypted with encryption key 40 to terminal 100R in executing a communication game.

Terminal 100R decrypts encrypted data 50 received from terminal 100S with decryption key 30 (decryption processing 62). Terminal 100R then determines whether or not encrypted data 50 has correctly been decrypted based on a result of decryption (determination processing 64). When the encrypted data is determined as having correctly been decrypted, a verification result 66 indicating that terminal 100S possesses authorized right of use 20 is outputted. This verification result 66 indicates successful verification. When terminal 100R representing another terminal receives encrypted data 50 from terminal 100S, it thus verifies received encrypted data 50 based on decryption key 30.

When verification of encrypted data 50 received from terminal 100S is successful, terminal 100R that does not satisfy the predetermined condition (the user who uses terminal 100R does not possess right of use 20) temporarily permits use of content data in the communication game thereby.

Regardless of whether or not the user who uses terminal 100 possesses right of use 20, terminal 100S may transmit encrypted data 50 to all other terminals 100 that execute the same communication game. In other words, terminal 100S may transmit encrypted data 50 to all other terminals 100 included in the plurality of terminals 100 that communicate for execution of the communication game. Furthermore, terminal 100S may transmit encrypted data 50 also to terminal 100S itself. In other words, terminal 100R may be terminal 100S itself.

In a modification, terminal 100S may transmit encrypted data 50 only to terminal 100R, the user of which does not possess right of use 20.

FIG. 7 shows a more detailed exemplary functional configuration of terminal 100S (transmission-side terminal) shown in FIG. 6.

Referring to FIG. 7, terminal 100S includes, as its functional configuration, an encryption key selection module 150, a verification character string generation module 152, and an encryption module 158. These modules may be implemented by execution of an application program (and/or system program 112) included in application data 114 by processor 102 of terminal 100.

Terminal 100S uses selection information which is information held in terminal 100 that receives encrypted data 50. The selection information is information that may change for each communication game and information that can be shared between/among terminals 100 during communication. For example, identification information (for example, a network address, a device number, or the like) indicating sender terminal 100 or information determined at the time of start of communication (for example, a random number, time of establishment of connection, a session number, or the like) can be used as the selection information.

Encryption key selection module 150 selects one encryption key 40 from encryption key group 400 based on the selection information. FIG. 7 shows an example where an encryption key 40_m is selected.

Verification character string generation module 152 generates verification character string 156 based on the selection information. Verification character string generation module 152 generates verification character string 156 in accordance with a predetermined verification character string generation rule 154. Verification character string generation rule 154 defines, for example, incorporation of the selection information in verification character string 52. According to such a definition, the selection information is directly or indirectly reflected on verification character string 156.

Encryption module 158 generates encrypted data 50 by encrypting verification character string 156 with encryption key 40_m selected by encryption key selection module 150. Encrypted data 50 is transmitted to other terminals 100 including terminal 100R.

Figure 8:
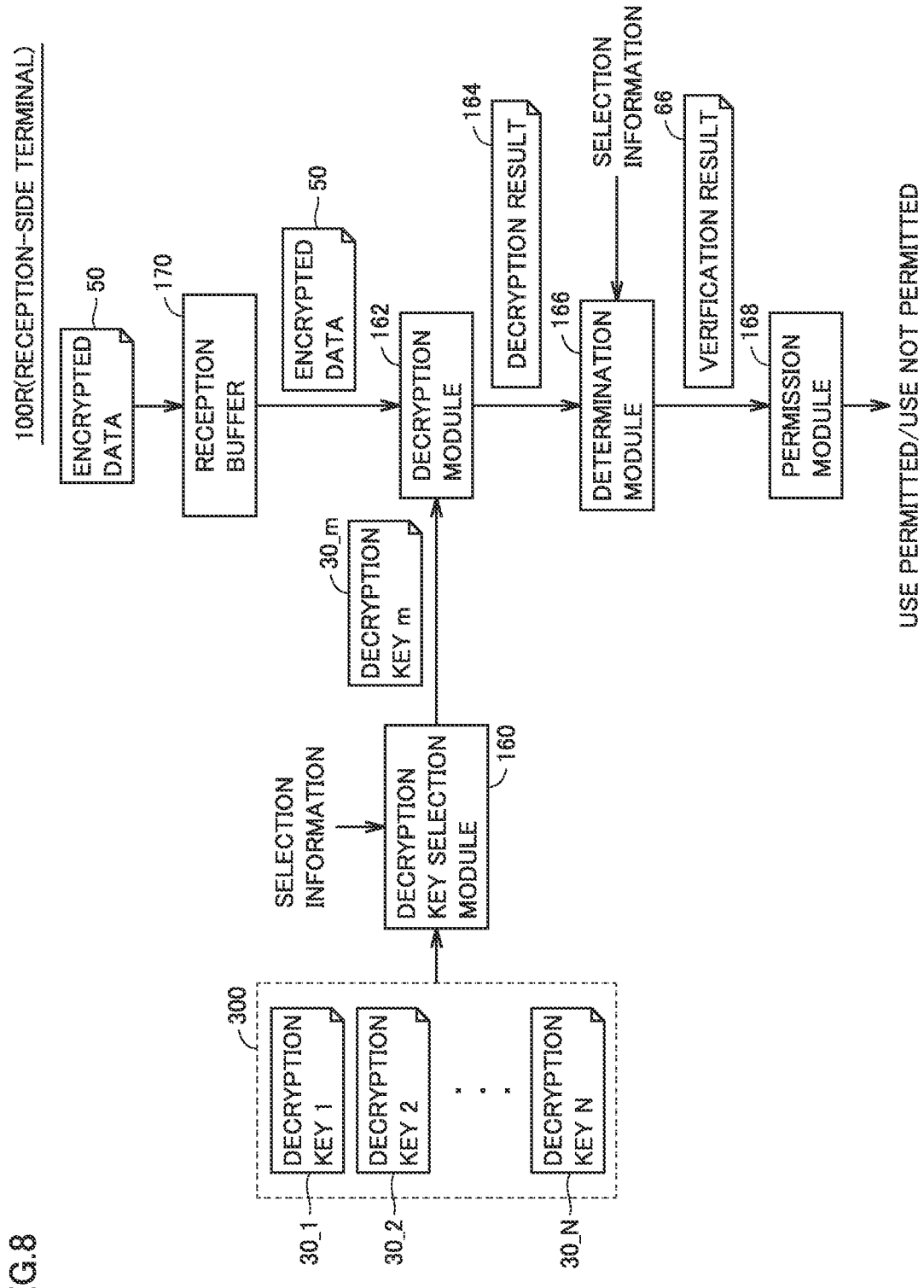
FIG. 8 shows an exemplary illustrative non-limiting drawing illustrating a more detailed exemplary functional configuration of the terminal (reception-side terminal) shown in FIG. 6.

Terminal 100S thus generates encrypted data 50 with encryption key 40_m selected from a plurality of encryption FIG. 8 shows a more detailed exemplary functional configuration of terminal 100R (reception-side terminal) shown in FIG. 6.

Referring to FIG. 8, terminal 100R includes, as its functional configuration, a decryption key selection module 160, a decryption module 162, a determination module 166, and a permission module 168. These modules may be implemented by execution of an application program (and/or system program 112) included in application data 114 by processor 102 of terminal 100.

Encrypted data 50 received by terminal 100R is stored in a reception buffer 170.

Decryption key selection module 160 selects one decryption key 30 from decryption key group 300 based on the selection information. FIG. 8 shows an example in which a decryption key 30_m is selected.

Decryption module 162 and determination module 166 verify encrypted data 50 received from terminal 100S based on decryption key 30. Specifically, decryption module 162 and determination module 166 correspond to a verification module that verifies, upon reception of encrypted data 50 encrypted with encryption key 40 corresponding to decryption key 30 from terminal 100 that satisfies a predetermined condition, that encrypted data 50 based on decryption key 30.

Encryption key selection module 150 and decryption key selection module 160 are each appropriately designed such that encryption key 40 selected by encryption key selection module 150 (FIG. 7) based on the selection information and decryption key 30 selected by decryption key selection module 160 (FIG. 8) based on the selection information correspond to each other.

Decryption module 162 decrypts encrypted data 50 with decryption key 30_m selected by decryption key selection module 160. A result 164 of decryption by decryption module 162 is outputted to determination module 166.

Determination module 166 determines whether or not decryption result 164 is in conformity with a predetermined rule (verification character string generation rule 154 shown in FIG. 7) based on the selection information corresponding to decryption result 164. When decryption result 164 is in conformity with verification character string generation rule 154, determination module 166 determines that encrypted data 50 has correctly been decrypted (that is, verification has been successful). When decryption result 164 is not in conformity with verification character string generation rule 154, on the other hand, determination module 166 determines that decryption of encrypted data 50 has failed. Determination module 166 outputs verification result 66 indicating that authorized right of use 20 is possessed when encrypted data 50 is correctly decrypted.

Terminal 100R thus verifies encrypted data 50 with decryption key 30_m selected from decryption keys 30 based on information (selection information) held also in terminal 100S.

The selection information may be obtained with any method when connection to another terminal 100 is established or when encrypted data 50 is received. Since selection information may be different for each piece of encrypted data 50, encrypted data 50 and selection information may be stored in correspondence with each other.

Permission module 168 permits temporary use of restricted content data 34 (see FIG. 5) based on verification result 66. Specifically, when encrypted data 50 received from terminal 100S is successfully verified (verification result 66 indicating that authorized right of use 20 is possessed is outputted) while terminal 100R does not satisfy a predetermined condition, permission module 168 temporarily permits use by terminal 100R, of restricted content data 34 in a communication game.

The user who uses terminal 100R is thus permitted to use restricted content data 34 on condition that verification result 66 indicating that right of use 20 has successfully been verified is outputted.

The functional configuration shown in FIG. 7 and the functional configuration shown in FIG. 8 may both be implemented in the same terminal 100.

D. Processing Procedure

An exemplary processing procedure including verification processing performed in the system according to the present embodiment will now be described.

In the description below, a PVP game is assumed as an exemplary communication game. A cooperative game in which a user cooperates with another user may be applicable as the communication game. Game contents may be a battle game, a sport game, a puzzle game, and the like. Standard content data 32 (FIG. 5) includes one piece or a plurality of pieces of PVP stage data prepared as the standard (which will also be referred to as "standard stage data" below) and restricted content data 34 includes one piece or a plurality of pieces of PVP stage data (which will also be referred to as "additional stage data" below) prepared additionally. Character data, item data, and the like may be applicable as restricted content data 34.

When at least one user who participates in the same communication game possesses right of use 20, another user who participates in the communication game can also select a stage included in restricted content data 34.

d1: Overall Processing

Figure 9:
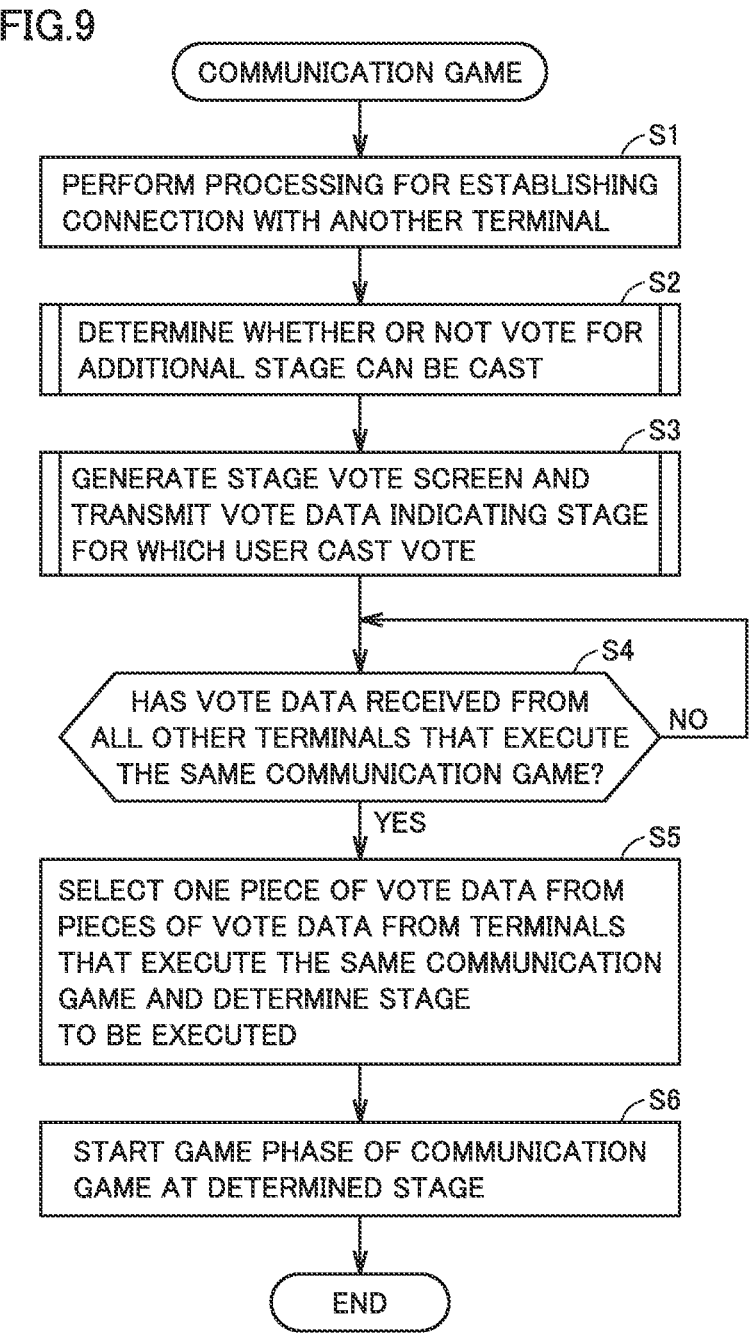
FIG. 9 shows an exemplary illustrative non-limiting flow-chart illustrating a procedure of processing performed by the terminal in the system according to the present embodiment.

FIG. 9 shows an exemplary procedure of processing performed by terminal 100 of the system according to the present embodiment. Each of a plurality of terminals 100 that execute the same communication game performs processing shown in FIG. 9. Each step shown in FIG. 9 and FIGS. 10 to 13 which will be described later may be implemented by execution of an application program (and/or system program 112) included in application data 114 by processor 102 of terminal 100.

The processing procedure shown in FIG. 9 includes a game phase (step S6) in which the plurality of terminals 100 proceed with a game and a preparation phase (steps S1 to S5) preceding the game phase.

Referring to FIG. 9, terminal 100 performs processing for establishing connection to another terminal 100 in accordance with an operation by a user (step S1). Setting (matching) of one or more users who participate in the same communication game may be made with a predetermined method in response to requests from a plurality of users who desire to participate in the communication game. For example, matching of users comparable to each other in skill level may be made.

The user may be notified in advance of a rule applied to a communication game to be executed. The applied rule may freely be determined by a user who plays a role as a host (master) of the communication game or may be determined with a predetermined method.

In succession, terminal 100 determines whether or not a vote for an additional stage can be cast (step S2). Terminal 100 then generates a stage vote screen and transmits to another terminal 100, vote data indicating the stage for which the user cast a vote (step S3).

Terminal 100 determines whether or not it has received vote data from all other terminals 100 that execute the same communication game (step S4). When terminal 100 has not received vote data from all other terminals 100 that execute the same communication game (NO in step S4), processing in step S4 is repeated.

When terminal 100 has received vote data from all other terminals 100 that execute the same communication game (YES in step S4), terminal 100 selects one of pieces of vote data from terminals 100 that execute the same communication game and determines a stage to be executed (step S5). The preparation phase preceding the game phase is thus completed.

In succession, terminal 100 starts the game phase of the communication game at the determined stage (step S6).

Processing in step S5 may be performed only by terminal 100 used by the user who plays the role as the host (master) of the communication game and another terminal 100 may simply receive information on the determined stage.

d2: Determination as to Whether or Not Vote for Additional Stage Can Be Cast FIG. 10 shows a more detailed exemplary processing procedure in step S2 shown in FIG. 9.

Figure 10:
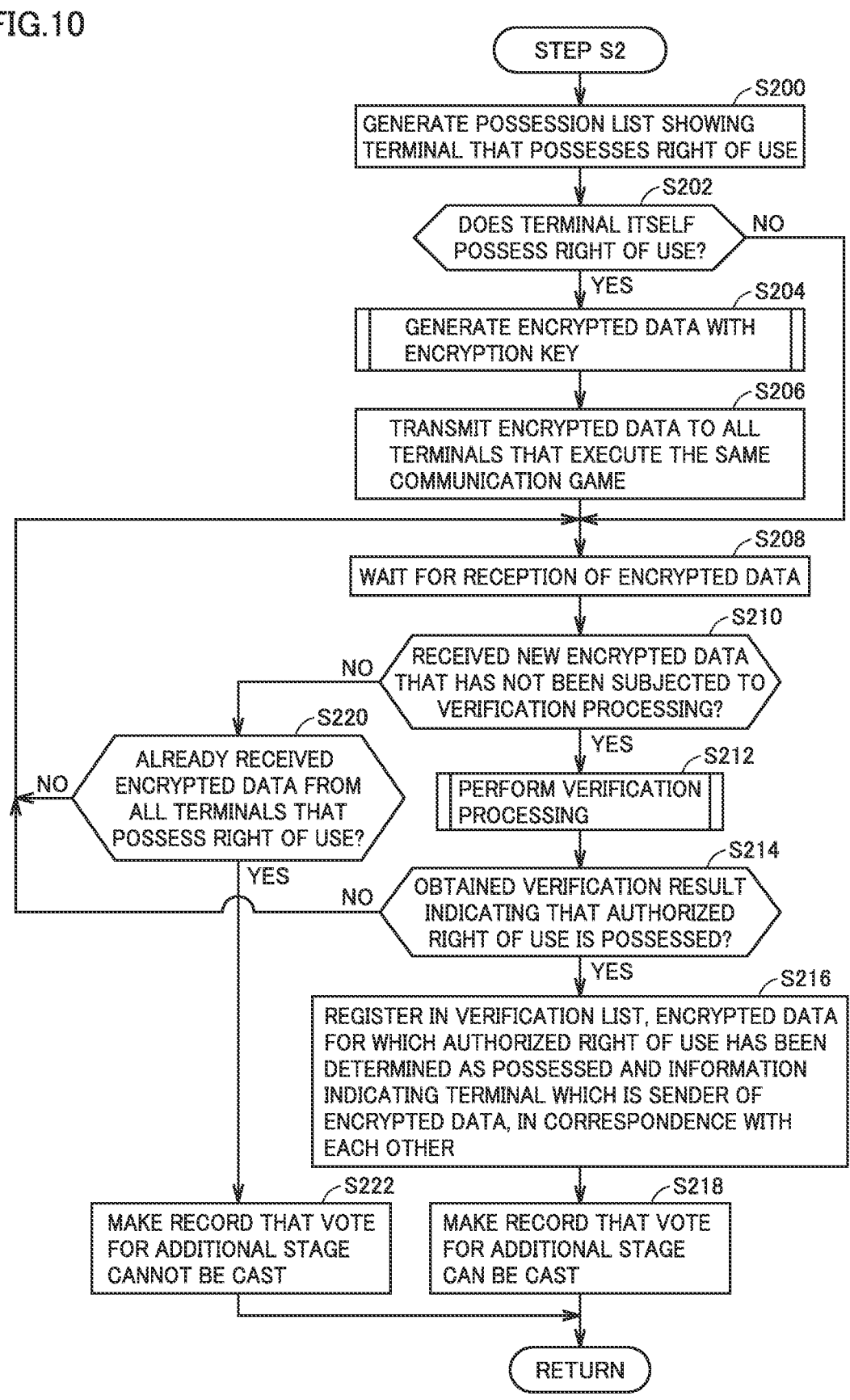
FIG. 10 shows an exemplary illustrative non-limiting flowchart illustrating a more detailed processing procedure in step S2 shown in FIG. 9.

Referring to FIG. 10, terminal 100 generates a possession list showing terminal 100 that possesses right of use 20 (use right data 116), of terminals 100 that have established connection (terminals 100 that execute the same communication game) (step S200).

More specifically, each of terminals 100 that possess right of use 20 (use right data 116) transmits information indicating that terminal 100 itself satisfies the predetermined condition (information indicating possession of right of use 20) to all other terminals 100 included in a plurality of terminals 100 that communicate for execution of the communication game. Terminal 100 that has received the information generates the possession list based on information indicating that terminal 100 itself satisfies the predetermined condition.

In succession, terminal 100 determines whether or not terminal 100 itself possesses right of use 20 (use right data 116) (step S202). When terminal 100 itself possesses right of use 20 (use right data 116) (YES in step S202), it generates encrypted data 50 with encryption key 40 included in use right data 116 (step S204) and transmits the encrypted data to all terminals 100 that execute the same communication game (step S206).

Terminal 100 that satisfies the predetermined condition thus transmits to another terminal 100, when it executes the communication game, encrypted data 50 encrypted with encryption key 40 corresponding to decryption key 30.

When terminal 100 itself does not possess right of use 20 (use right data 116) (NO in step S202), processing in steps S204 and S206 is skipped.

Terminal 100 waits for reception of encrypted data 50 (step S208). Terminal 100 determines whether or not it has received new encrypted data 50 that had not been subjected to verification processing (step S210). Though the same encrypted data 50 may be received a plurality of times, encrypted data 50 that has already been subjected to verification processing does not have to newly be verified. Step S210 is processing for preventing the same encrypted data 50 from being subjected to verification processing a plurality of times.

When terminal 100 has received new encrypted data 50 that had not been subjected to verification processing (YES in step S210), it performs verification processing (step S212). Thus, when terminal 100 receives encrypted data 50 from terminal 100 that satisfies a predetermined condition, it verifies received encrypted data based on decryption key 30.

In succession, terminal 100 determines whether or not it has obtained a verification result indicating that it possesses authorized right of use 20 as a result of verification processing (step S214). In other words, terminal 100 determines whether or not verification processing has been successful.

When terminal 100 obtains the verification result indicating that it possesses authorized right of use 20 (YES in step S214), it registers in a verification list, encrypted data 50 for which authorized right of use 20 is determined as possessed and information indicating terminal 100 which is a sender of encrypted data 50, in correspondence with each other (step S216). Terminal 100 makes a record that a vote for an additional stage can be cast (step S218). The process then returns.

The verification result may be registered in an independent verification list or in a possession list (for example, added as attribute information).

Thus, when verification of encrypted data 50 received by terminal 100 that does not satisfy the predetermined condition from terminal 100 that satisfies the predetermined condition is successful, use of restricted content data 34 in the communication game by terminal 100 that does not satisfy the predetermined condition (including vote for an additional stage and a PVP game in the additional stage as a result of the vote in the present embodiment) is temporarily permitted.

When the verification result indicating that authorized right of use 20 is possessed is not obtained (NO in step S214), processing in step S208 and later is repeated.

When terminal 100 has not received new encrypted data 50 that had not been subjected to verification processing (NO in step S210), it refers to the possession list generated in step S200 and determines whether or not it has already received encrypted data 50 from all terminals 100 that possess right of use 20 (use right data 116) (step S220).

Whether or not encrypted data 50 has been received from all terminals 100 that possess right of use 20 is thus determined based on the possession list.

When there is terminal 100 from which encrypted data 50 has not been received (NO in step S220), processing in step S208 and later is repeated.

When terminal 100 has already received encrypted data 50 from all terminals 100 that possess right of use 20 (use right data 116) (YES in step S220), it makes a record that a vote for an additional stage cannot be cast (step S222). The process then returns.

Thus, when encrypted data 50 has been received from all terminals 100 that possess right of use 20 and verification of all pieces of received encrypted data 50 fails, use of restricted content data 34 in the communication game by terminal 100 is not permitted.

d3: Generation of Encrypted Data

Figure 11:
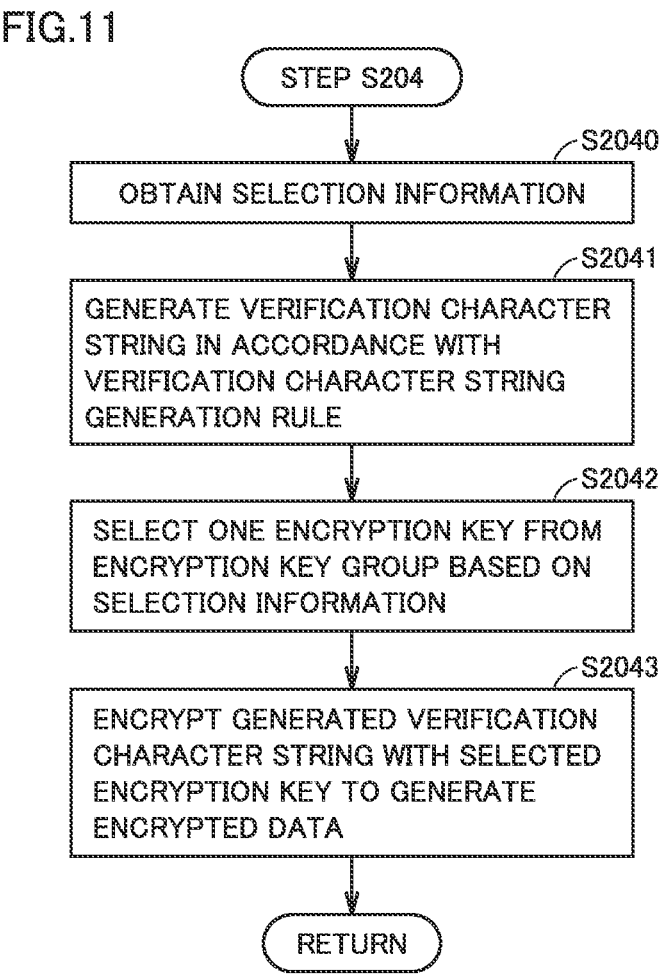
FIG. 11 shows an exemplary illustrative non-limiting flowchart illustrating a more detailed processing procedure in step S204 shown in FIG. 10.

FIG. 11 shows a more detailed exemplary processing procedure in step S204 shown in FIG. 10.

Referring to FIG. 11, terminal 100 obtains selection information (step S2040). Terminal 100 generates verification character string 156 in accordance with verification character string generation rule 154 (step S2041).

Terminal 100 selects one encryption key 40 from encryption key group 400 based on the selection information (step S2042). Terminal 100 generates encrypted data 50 by encrypting generated verification character string 156 with selected encryption key 40 (step S2043). The process then returns.

d4: Verification Processing

Figure 12:
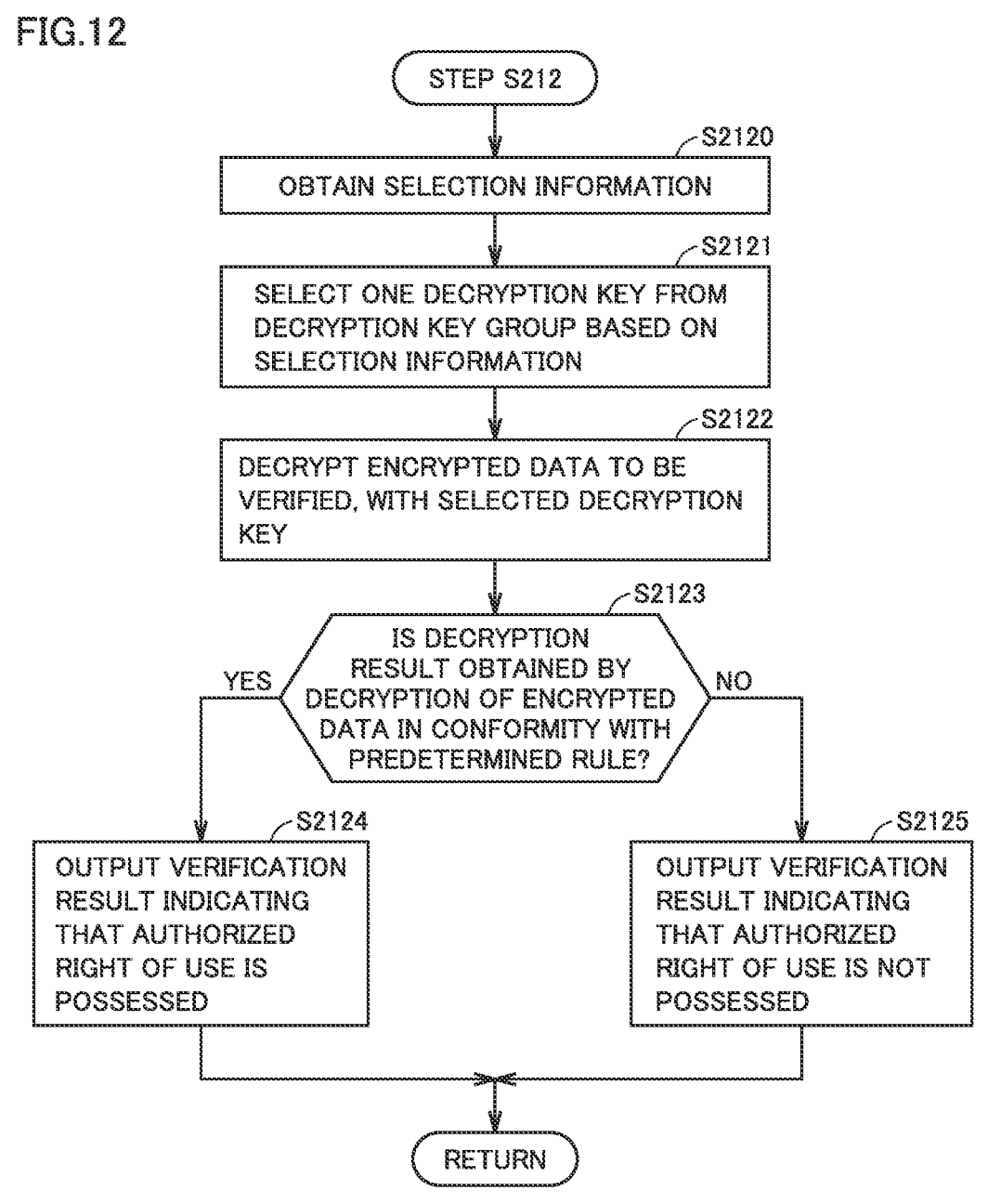

FIG. 12 shows a more detailed exemplary processing procedure in step S212 shown in FIG. 10.

Referring to FIG. 12, terminal 100 obtains selection information (step S2120). Terminal 100 selects one decryption key 30 from decryption key group 300 based on the selection information (step S2121). Terminal 100 then decrypts encrypted data 50 to be verified, with selected decryption key 30 (step S2122).

Terminal 100 determines whether or not decryption result 164 obtained by decryption of encrypted data 50 is in conformity with a predetermined rule (step S2123). When decryption result 164 is in conformity with the predetermined rule (YES in step S2123), terminal 100 outputs a verification result indicating that it possesses authorized right of use 20 (verification has been successful) (step S2124). The process then returns.

Thus, even in an example where terminal 100 receives encrypted data 50 a plurality of times, when verification of one of the plurality of pieces of received encrypted data 50 is successful, the verification result indicating that the terminal possesses authorized right of use 20 is outputted. Therefore, as verification of one piece of encrypted data 50 is successful, use of restricted content data 34 in the communication game by terminal 100 is temporarily permitted.

When decryption result 164 is not in conformity with the predetermined rule (NO in step S2123), on the other hand, terminal 100 outputs a verification result indicating that it does not possess authorized right of use 20 (verification fails) (step S2125). The process then returns.

d5: Generation of Stage Vote Screen and Vote for Stage

Figure 13:
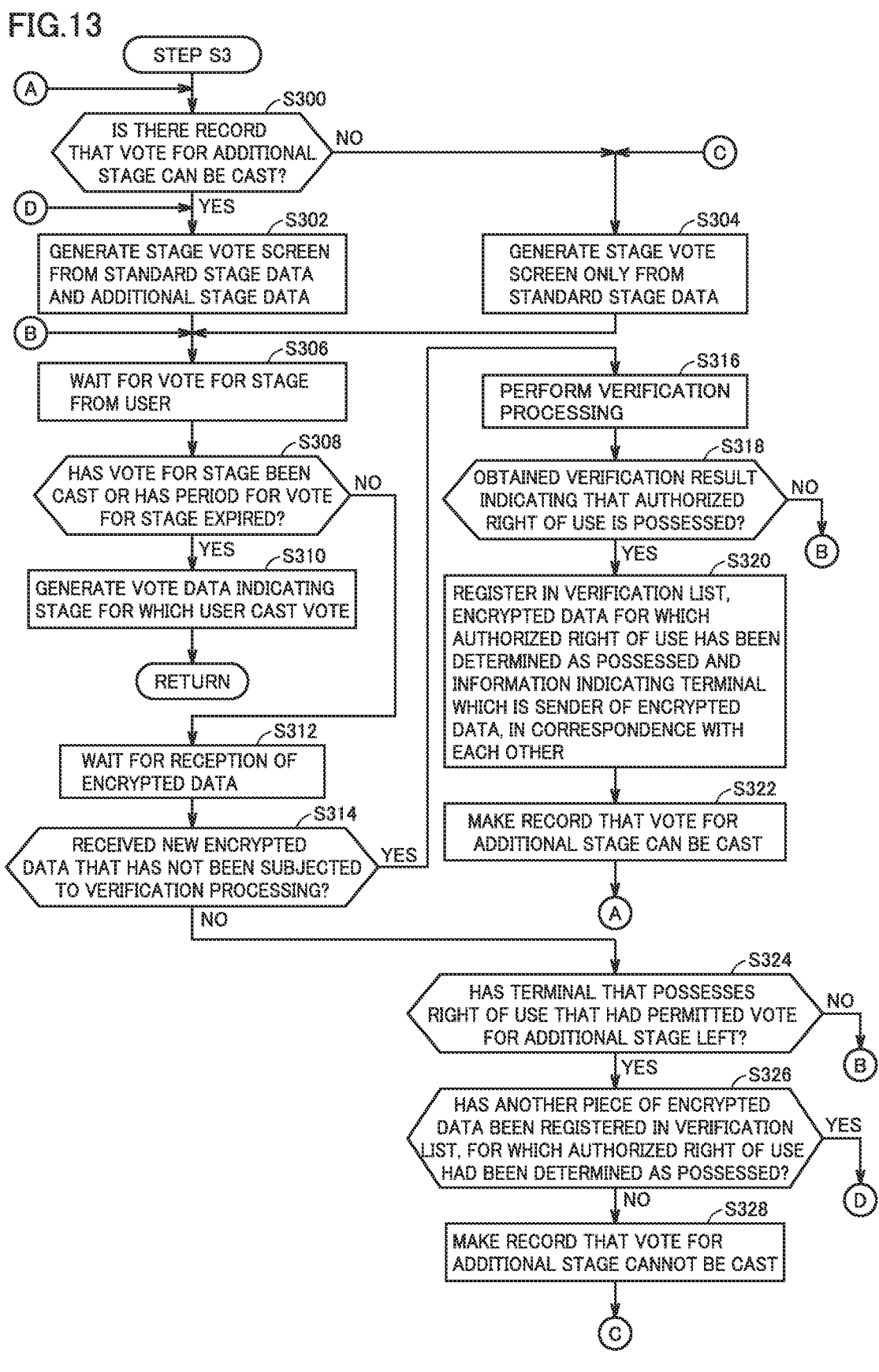
FIG. 13 shows an exemplary illustrative non-limiting flowchart illustrating a more detailed processing procedure in step S3 shown in FIG. 9.

FIG. 13 shows a more detailed exemplary processing procedure in step S3 shown in FIG. 9.

Referring to FIG. 13, terminal 100 determines whether or not there is a record that a vote for an additional stage can be cast (step S300).

When there is a record that a vote for an additional stage can be cast (YES in step S300), terminal 100 generates a stage vote screen from standard stage data and additional stage data (step S302). In other words, the stage vote screen in which the vote for the additional stage can be cast is generated.

When there is no record that the vote for the additional stage can be cast (NO in step S300), terminal 100 generates a stage vote screen only from the standard stage data (step S304).

Terminal 100 waits for a vote for a stage from a user (step S306). Terminal 100 determines whether or not the vote for the stage has been cast or a period for the vote for the stage has expired (step S308).

When the vote for the stage has been cast or the period for the vote for the stage has expired (YES in step S308), terminal 100 generates vote data indicating the stage for which the user cast the vote (step S310). When the period for the vote for the stage has expired, the vote may automatically be cast for the stage determined with any method. The process then returns.

When the vote for the stage has not been cast and the period for the vote for the stage has not expired (NO in step S308), terminal 100 waits for reception of encrypted data 50 (step S312).

Terminal 100 determines whether or not it has received new encrypted data 50 that had not been subjected to verification processing (step S314).

When terminal 100 has received new encrypted data 50 that had not been subjected to verification processing (YES in step S314), terminal 100 performs verification processing (step S316). A detailed processing procedure in verification processing (step S316) is similar to the processing procedure shown in FIG. 12.

When processing for verification of at least one piece of encrypted data 50 is successful in step S2, encrypted data 50 received thereafter is not subjected to verification processing and processing is continued regarding the vote for the additional stage as being allowable. Steps S314 and S316 mainly fall under processing for verifying encrypted data 50 that may be received after initial successful verification processing. For example, in participation by a new user, there may be a possibility that new encrypted data 50 is transmitted from terminal 100 used by the new user. When terminal 100 that possesses right of use 20 that has permitted the vote for the additional stage leaves (see step S326 or the like), whether or not there is another piece of encrypted data 50 that has successfully been verified is determined. Therefore, preparation of another piece of encrypted data 50 in steps S314 and S316 is also intended.

Terminal 100 determines whether or not the verification result indicating that it possesses authorized right of use 20 is obtained as a result of verification processing (step S318). When the verification result indicating that terminal 100 possesses authorized right of use 20 is obtained (YES in step S318), terminal 100 registers in a verification list, encrypted data 50 for which authorized right of use 20 is determined as possessed and information indicating terminal 100 which is a sender of encrypted data in correspondence with each other (step S320). Terminal 100 makes a record that the vote for the additional stage can be cast (step S322). Processing in step S300 and later is then repeated.

When the verification result indicating that the terminal possesses authorized right of use 20 is not obtained (NO in step S318), processing in step S306 and later is repeated.

When terminal 100 has not received new encrypted data 50 that had not been subjected to verification processing (NO in step S314), terminal 100 determines whether or not terminal 100 that possesses right of use 20 that had permitted the vote for the additional stage has left (step S324).

When terminal 100 that possesses right of use 20 that had permitted the vote for the additional stage has left (YES in step S324), terminal 100 determines whether or not another piece of encrypted data 50 for which authorized right of use 20 had been determined as possessed has been registered in the verification list (step S326).

When another piece of encrypted data 50 for which authorized right of use 20 had been determined as possessed has been is registered in the verification list (YES in step S326), processing in step S302 and later is repeated.

When another piece of encrypted data 50 for which authorized right of use 20 had been determined as possessed has not been registered in the verification list (NO in step S326), terminal 100 makes a record that the vote for the additional stage cannot be cast (step S328). Processing in step S304 and later is then repeated.

When terminal 100 that possesses right of use 20 that had permitted the vote for the additional stage has not left (NO in step S324), processing in step S306 and later is repeated.

When vote data indicating the stage for which the user cast the vote is generated (step S310) in the processing procedure shown in FIG. 13, the process returns. Therefore, when terminal 100 that possesses right of use 20 that has permitted the vote for the additional stage leaves thereafter, vote data is handled as being valid. In this case, even when terminal 100 that has transmitted successfully verified encrypted data leaves the communication game, in terminal 100 temporarily permitted to use restricted content data 34, use of restricted content data 34 is continually permitted in the game phase following the preparation phase.

In the processing procedure shown in FIG. 13, when an operation by the user (for example, the vote by the user) in connection with use of restricted content data 34 is accepted in the preparation phase, in spite of leaving of terminal 100 that has transmitted successfully verified encrypted data 50 from the communication game in the preparation phase, in the game phase, use of restricted content data 34 is continually permitted.

The user may also select a stage other than the additional stage in the stage vote screen including the additional stage. In spite of selection of a stage other than the additional stage by a certain user, when another user selects the additional stage, decision on execution of the additional stage may be made. Therefore, the operation by the user in connection with use of restricted content data 34 includes not only the operation to vote for the additional stage included in restricted content data 34 but also an operation to vote for a stage other than the additional stage.

In a modification, even when terminal 100 that has transmitted successfully verified encrypted data 50 leaves the communication game before acceptance of an operation by the user in connection with use of restricted content data 34, use of restricted content data 34 may continually be permitted.

When terminal 100 that has transmitted successfully verified encrypted data 50 leaves the communication game after acceptance of an operation by the user in connection with use of restricted content data 34 in the preparation phase, in the game phase following the preparation phase, use of restricted content data 34 may again be prohibited.

In the processing procedure shown in FIG. 13, when terminal 100 that possesses right of use 20 that has permitted the vote for the additional stage leaves before generation of vote data indicating the stage for which the user cast the vote, use of restricted content data 34 (the vote for the additional stage) is continually permitted so long as there is another terminal 100 that possesses right of use 20. When there is no other terminal 100 that possesses right of use 20, on the other hand, use of restricted content data 34 is prohibited.

Even when terminal 100 that possesses right of use 20 that has permitted the vote for the additional stage leaves, use of restricted content data 34 may continually be permitted.

d6: Checking of Authenticity of Vote Data

Terminal 100 may check authenticity of vote data before it determines the stage to be executed based on the vote data. For example, the vote data transmitted from terminal 100 may include information indicating right of use 20 that has permitted use of restricted content data 34, in addition to the selected stage. The information indicating right of use 20 may include, for example, corresponding encrypted data 50 and information indicating terminal 100 which is the sender of encrypted data 50.

Terminal 100 may perform again processing for verification of vote data that designates an additional stage, based on information included in the vote data, before it determines a stage to be executed based on the vote data.

At this time, when right of use 20 is determined as being unauthorized as a result of verification processing again, one or more terminals 100 may be disconnected.

E. Other Forms e1: Verification Processing

When received encrypted data 50 is successively verified and at least one piece of encrypted data 50 satisfies a predetermined condition in the embodiment described above, use of restricted content data 34 is temporarily permitted. Therefore, after the predetermined condition is satisfied, encrypted data 50 does not necessarily have to be verified.

While the vote by the user has not been completed, another piece of received encrypted data 50 may be verified as in the embodiment described above. By verifying all pieces of encrypted data 50, absence of unauthorized terminal 100 can be confirmed.

All pieces of received encrypted data 50 may be verified. In this case, when there is another terminal 100 that has been successful in verification of encrypted data 50 in spite of leaving of terminal 100 that has been successful in verification of encrypted data 50, temporary use of restricted content data 34 can smoothly continually be valid.

In another modification, use of restricted content data 34 may temporarily be permitted only when verification of all pieces of received encrypted data 50 is successful and all terminals 100 that have transmitted encrypted data 50 satisfy the predetermined condition.

e2: Verification Result

Since terminal 100 contains content data in the embodiment described above, terminal 100 permits access to the content data based on the verification result indicating that it possesses authorized right of use 20.

In a modification, terminal 100 may transmit the verification result to the outside so as to be able to share the verification result with another terminal 100 that is executing the same communication game. When a part of content data, use of which is temporarily permitted, is stored in a server or the like, terminal 100 may transmit the verification result to the outside so as to permit access to the content data stored in the server.

e3: Exemplary Application of Verification Processing

In the embodiment described above, each of terminals 100 determines whether or not another terminal 100 (or the user who uses another terminal 100) that executes the same communication game satisfies a predetermined condition. When it is determined that the predetermined condition is satisfied, use of content data is temporarily permitted in the communication game.

Determination (verification processing) as to whether or not a predetermined condition is satisfied is applicable to any processing, without being limited to the scheme to permit temporary use of content data contained in terminal 100.

For example, in an example where terminal 100 alone that satisfies the predetermined condition holds restricted content data 34 (content data), verification processing can be used to check whether or not terminal 100 that holds restricted content data 34 really satisfies the predetermined condition.

Verification processing may be performed only for the purpose of determination as to whether or not a predetermined condition is satisfied, independently of restricted content data 34 (content data), and a result of verification processing may be used in any processing.

In other words, terminal 100 can determine, for any purpose, whether or not another terminal 100 and/or terminal 100 itself satisfy/satisfies a predetermined condition. A result of determination (verification result) may be used in any processing.

Though an embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A system configured to execute a communication game, the system comprising:
  a plurality of terminals, wherein each of the plurality of terminals comprises
    content data that is available at least in the communication game when at least a predetermined condition is satisfied, and
    a decryption key,
  a first terminal of the plurality of terminals that satisfies at least the predetermined condition comprises an encryption key corresponding to the decryption key,
  the first terminal transmits encrypted data encrypted with the encryption key to another terminal when the first terminal executes the communication game,
  when the another terminal receives the encrypted data from the first terminal, the another terminal verifies the encrypted data based on the decryption key, and
  when the another terminal receives a plurality of pieces of the encrypted data and verification of one piece of encrypted data of the plurality of pieces of encrypted data is successful, the another terminal temporarily permits use of the content data in the communication game by the another terminal, wherein
  the first terminal and the another terminal execute the communication game using the content data, at least the first terminal transmits information indicating that the first terminal satisfies the predetermined condition to at least all other terminals included in the plurality of terminals, and
  the another terminal determines whether the another terminal has received the encrypted data from at least the first terminal, based on the information indicating satisfaction of the predetermined condition.

2. The system according to claim 1, wherein
  each of the plurality of terminals comprises a plurality of decryption keys,
  the first terminal comprises a plurality of encryption keys corresponding to the plurality of decryption keys, respectively,
  the first terminal generates the encrypted data with an encryption key selected based on information held in the another terminal from the plurality of encryption keys, and
  the another terminal verifies the encrypted data with a decryption key selected from the plurality of decryption keys based on the information held in the another terminal.

3. The system according to claim 1, wherein
  each of the plurality of terminals holds the encryption key when the predetermined condition is satisfied.

4. The system according to claim 1, wherein
  each of the plurality of terminals further comprises the encryption key, and
  each of the plurality of terminals is permitted to use the encryption key when the predetermined condition is satisfied.

5. The system according to claim 1, wherein
  the first terminal transmits the encrypted data to at least all other terminals included in the plurality of terminals.

6. The system according to claim 1, wherein
  when the encrypted data is received from at least the first terminal and verification of all pieces of received encrypted data fails, use of the content data in the communication game by the another terminal is not permitted.

7. The system according to claim 1, wherein
  the communication game includes a game phase in which the plurality of terminals proceed with a game and a preparation phase preceding the game phase, and
  even when the first terminal that has transmitted the successfully verified encrypted data leaves from the communication game in the preparation phase, in a game phase following the preparation phase, use of the content data is continually permitted in the another terminal temporarily permitted to use the content data.

8. The system according to claim 7, wherein
  when an operation by a user in connection with use of the content data is accepted in the preparation phase, in spite of leaving of the first terminal that has transmitted the successfully verified encrypted data from the communication game in the preparation phase, use of the content data is continually permitted in the game phase.

9. The system according to claim 1, wherein the communication game includes a player-versus-player game.

10. A non-transitory computer-readable storage medium having an executable program for execution of a communication game with communication with another apparatus stored thereon, the program causing a computer comprising content data that is available at least in the communication game when at least a predetermined condition is satisfied and a decryption key to provide execution comprising:

receiving encrypted data encrypted with an encryption key corresponding to the decryption key from an apparatus among other apparatuses that satisfies the predetermined condition, wherein each of the apparatuses includes the content data that is available at least in the communication game when at least the predetermined condition is satisfied, and the decryption key;

verifying the received encrypted data based on the decryption key; and temporarily permitting use of the content data in the communication game when the another apparatus receives a plurality of pieces of the encrypted data and verification of one piece of encrypted data of the plurality of pieces of encrypted data is successful, wherein the apparatus and the another apparatus execute the communication game using the content data, at least the computer transmits information indicating that the computer satisfies the predetermined condition to at least all other apparatuses included in the other apparatuses, and the another apparatus determines whether the another apparatus has received the encrypted data from at least the computer, based on the information indicating satisfaction of the predetermined condition.

11. The non-transitory computer-readable storage medium according to claim 10, wherein the computer comprises a plurality of decryption keys and a plurality of encryption keys corresponding to the plurality of decryption keys, respectively, the program causes the computer to perform generating the encrypted data with an encryption key selected based on information held in the another apparatus from the plurality of encryption keys, and the another apparatus verifies the encrypted data with a decryption key selected from the plurality of decryption keys based on the information held in the another apparatus.

12. The non-transitory computer-readable storage medium according to claim 10, wherein the computer further comprises the encryption key, and the computer is permitted to use the encryption key when the predetermined condition is satisfied.

13. A method of executing a communication game with communication between/among a plurality of terminals, each of the plurality of terminals comprising content data that is available at least in the communication game in association with at least a predetermined condition being satisfied and a decryption key, the method comprising:

transmitting, by a first terminal of the plurality of terminals that satisfies the predetermined condition, encrypted data encrypted with an encryption key corresponding to the decryption key to another terminal when the first terminal executes the communication game;

verifying, by the another terminal, in association with the another terminal receiving the encrypted data from the first terminal, the encrypted data based on the decryption key; and temporarily permitting, by the another terminal of the plurality of terminals that does not satisfy the predetermined condition, use of the content data in the communication game by the another terminal in association with the another terminal receiving a plurality of pieces of the encrypted data and verification of one piece of encrypted data of the plurality of pieces of encrypted data being successful, wherein the first terminal and the another terminal execute the communication game using the content data, at least the first terminal transmits information indicating that the first terminal satisfies the predetermined condition to at least all other terminals included in the plurality of terminals, and the another terminal determines whether the another terminal has received the encrypted data from at least the first terminal, based on the information indicating satisfaction of the predetermined condition.

14. The method according to claim 13, wherein each of the plurality of terminals comprises a plurality of decryption keys, the first terminal comprises a plurality of encryption keys corresponding to the plurality of decryption keys, respectively, and the method further comprises:

generating, by the first terminal, the encrypted data with an encryption key selected based on information held in the another terminal from the plurality of encryption keys; and verifying, by the another terminal, the encrypted data with a decryption key selected from the plurality of decryption keys based on the information held in the another terminal.

15. The method according to claim 13, wherein each of the plurality of terminals further comprises the encryption key, and the method further comprises permitting use the encryption key in each of the plurality of terminals when the predetermined condition is satisfied.

16. An information processing apparatus configured to execute a communication game with communication with another information processing apparatus, the information processing apparatus comprising:

processing circuitry including one or more processors;

content data that is available at least in the communication game when at least a predetermined condition is satisfied; and a decryption key, wherein the processing circuitry is configured to:

verify, when the one or more processors receive encrypted data encrypted with an encryption key corresponding to the decryption key from an information processing apparatus among other information processing apparatuses that satisfies the predetermined condition, the encrypted data based on the decryption key, and permit temporary use of the content data in the communication game when the another information processing apparatus receives a plurality of pieces of the encrypted data and verification of one piece of encrypted data of the plurality of pieces of encrypted data is successful, wherein the information processing apparatus and the another information processing apparatus execute the communication game using the content data, at least the information processing apparatus transmits information indicating that the information processing apparatus satisfies the predetermined condition to at least all other information processing apparatuses included in the other information processing apparatuses, and the another information processing apparatus determines whether the another information processing apparatus has received the encrypted data from at least the first terminal, based on the information indicating satisfaction of the predetermined condition.

17. The information processing apparatus according to claim 16, comprising:

a plurality of decryption keys; and a plurality of encryption keys corresponding to the plurality of decryption keys, respectively, wherein the information processing apparatus generates the encrypted data with an encryption key selected based on information held in the another information processing apparatus from the plurality of encryption keys, and the another information processing apparatus verifies the encrypted data with a decryption key selected from the plurality of decryption keys based on the information held in the another information processing apparatus.

18. The information processing apparatus according to claim 16, wherein the information processing apparatus further comprises the encryption key, and the information processing apparatus is permitted to use the encryption key when the predetermined condition is satisfied.

* * * * *